United States Patent [19]
Ejlertsen

[11] 3,729,798
[45] May 1, 1973

[54] STEEL SECTION HANDLING MECHANISM

[75] Inventor: Bent Ejlertsen, Herlev, Denmark

[73] Assignee: H. Nielsen & Son Maskinfabrik A/S, Herley, Denmark

[22] Filed: July 22, 1971

[21] Appl. No.: 165,305

Related U.S. Application Data

[63] Continuation-in-part of Ser. No. 107,233, Jan. 18, 1971, abandoned.

[52] U.S. Cl. ............29/200 A, 29/200 P, 29/211 M, 269/8
[51] Int. Cl. ............................................B23p 19/00
[58] Field of Search ..................29/200 A, 200 J, 29/211 M, 200 P, 200 B, 200 R; 269/8

[56] References Cited
UNITED STATES PATENTS

| | | |
|---|---|---|
| 2,176,664 | 10/1939 | Burke................................29/200 J |
| 2,750,659 | 6/1956 | Sassi................................29/211 MX |
| 3,033,144 | 5/1962 | Schmidt..................................269/8 |

*Primary Examiner*—Thomas H. Eager
*Attorney*—Beveridge & DeGrandi

[57] ABSTRACT

A structural steel section handling apparatus for feeding elongated steel sections to a welding machine to be welded to plates. The apparatus includes a traveling crane supported on fixed rails and carrying a plurality of electromagnets arranged in a row and mounted for rotation about a common axis to support the steel sections for transportation in their longitudinal direction to the welding machine and to relate the sections about an axis parallel to the direction of movement.

6 Claims, 6 Drawing Figures

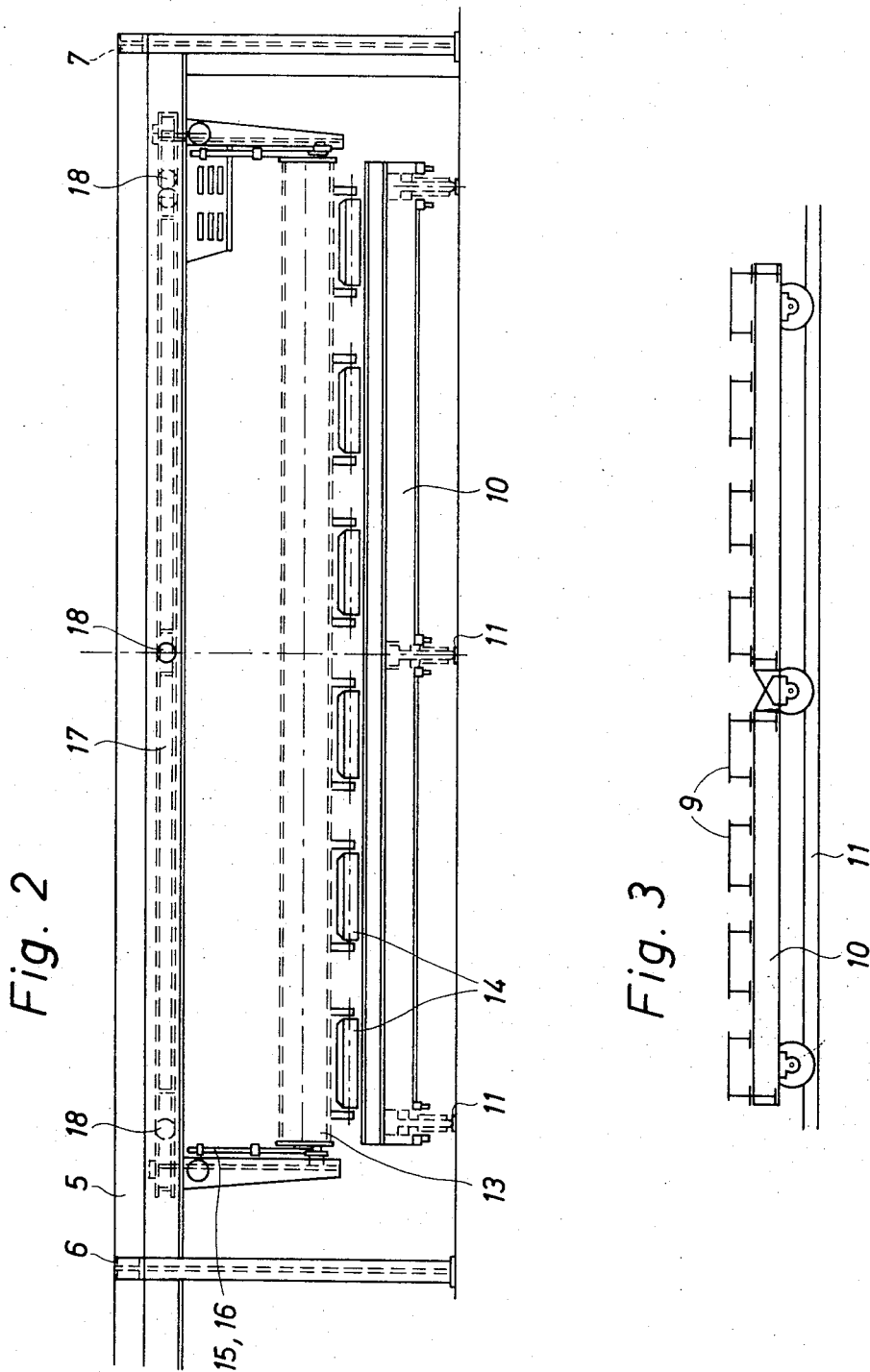

STEEL SECTION HANDLING MECHANISM

RELATED APPLICATIONS

This is a continuation-in-part of copending application Ser. No. 107,233, filed Jan. 18, 1971, now abandoned.

This invention relates to a section handling machine of the kind serving to advance structural steel sections to be welded to plates, the said sections being fed to the welding machine in their longitudinal direction which extends transversely of the direction of feeding and discharging the plates.

Such machines are often used at shipyards, where a steel plate is to be provided with a number of ribs welded thereto, the said ribs often consisting of structural steel shapes such as angles, flats, T-sections or bulb-sections, in the following referred to generally as sections.

Whenever the plate, which, by the way, may be of rather large dimensions, has been provided with a rail welded thereto, it is advanced somewhat in its direction of movement, corresponding to the distance between the ribs, after which a new section is advanced in its longitudinal direction to the plate, forced down against the plate and welded to same. The ribbed plate may constitute part of a ship's hull, a storage tank or a sheet piling, but it may further be used at any place where a steel plate reinforced with ribs is required.

In the known section handling machines the sections are fed via a chain table, a double tilting arrangement and a roller conveyor with a pushing unit, and the section is guided above the plate by means of rollers that can be lowered.

The object of the present invention is to provide a machine which simplifies the systems hitherto known.

According to the invention the machine has a low wagon crane supported on travelling rails and with rotatable carrying magnets arranged in a row for picking up sections from benches on a transversely movable table and for advancing the sections in their longitudinal direction to the point of welding.

A simple embodiment of the machine is obtained according to the invention by adapting it in such manner that a low wagon crane supported on travelling rails and with a magnet yoke rotatable about its axis for picking up the horizontally arranged sections from benches on a transversely movable table, turning the sections for example through 90° about their longitudinal axis, and advancing the sections in their longitudinal direction to the point of welding.

According to the invention the machine may be constructed in such manner that in addition to its travelling wheels it has pressure means provided directly beneath the travelling rails, for example in the form of underlying travelling wheels, the carrying magnets being rigidly suspended or compulsorily controlled in the yoke, and the yoke, again, being compulsorily controlled in the crane wagon by four hydraulic cylinders. When picking up a section from the transversely movable table, a downwardly directed pressure may be exerted by means of the four hydraulic cylinders against the section lying on the bench, thus straightening out the section if it is curved. The current for the magnets is then switched in and the section will remain straight, which is very important, since the section has to be perfectly straight when mounted on the plate. The same hydraulic cylinders are subsequently used for hoisting the section and turning it through 90°, after which the crane wagon moves into position above the plate to which the section is to be welded.

After being landed on the plate, but still retained by the magnets, the section is forced heavily against the plate by a number of hydraulic cylinders mounted on a stationary gantry. The current supply to the magnets is then interrupted and the crane wagon moves back across the transversely moving table in order to pick up the next section, whereas the section retained on the plate is welded to same. To provide a holding-up means against the relatively heavy pressure exerted by the stationary hydraulic cylinders, a vertically displaceable holding-up member may according to the invention be placed beneath the welding point and the plate to which the section is to be welded. The said holding-up member is then only kept in a raised position as long as the welding is being prepared and performed. While the plate is being advanced, the holding-up member is kept lowered.

According to the invention the holding-up member may consist of a vertically displaceable girder resting by means of rollers on a horizontally displaceable wedge rail.

The drawing shows a section handling machine constructed in accordance with the invention.

FIG. 2 is an endview of a part of the plant, shown on a larger scale,

FIG. 3 is a sideview of same,

Figure 1:
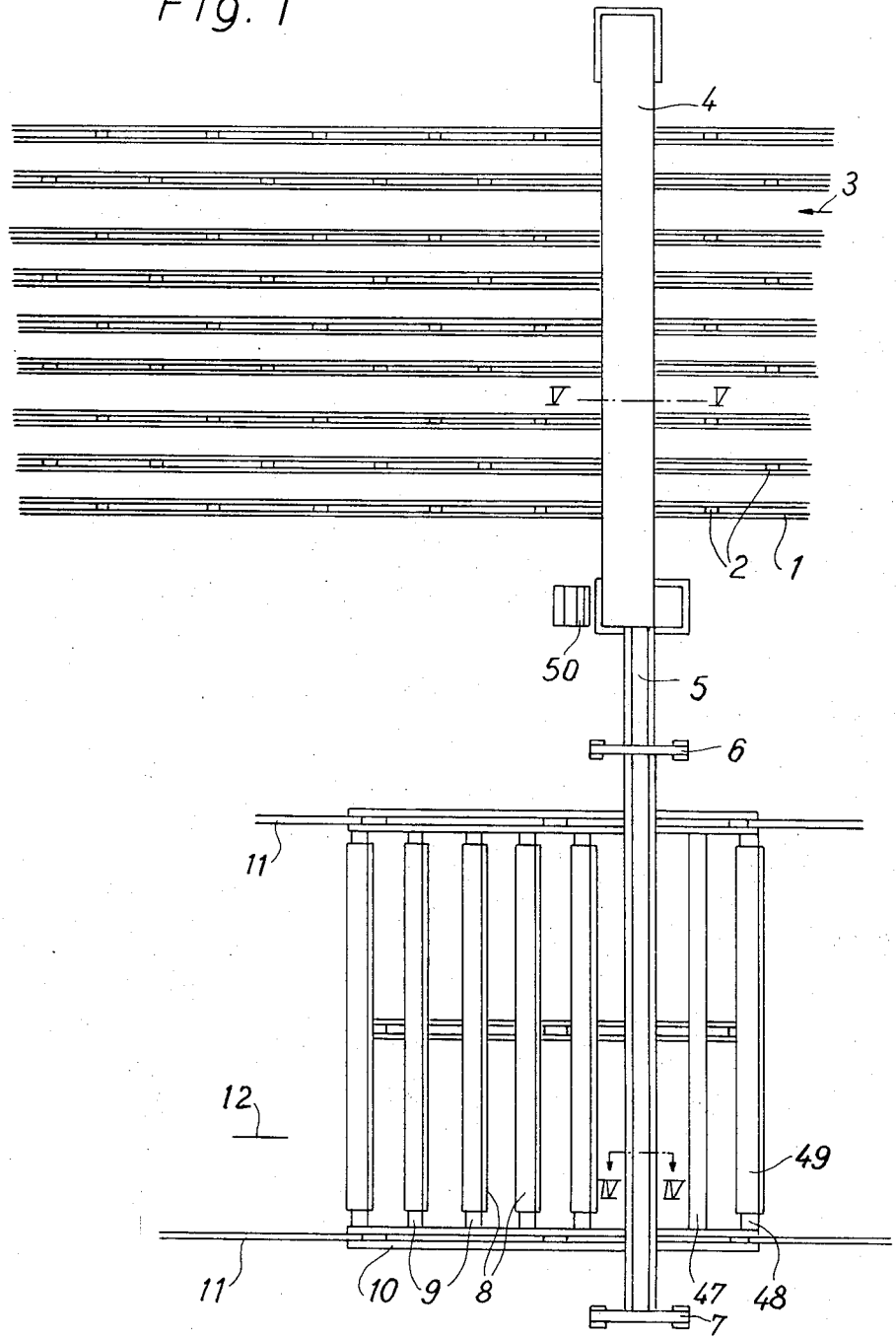
FIG. 1 shows the machine incorporated in a larger plant shown in part only.

In the drawing, 1 is a conveyor path for steel plates or steel plate panels, that is, two or more plates welded together along their edges and advanced in the direction of an arrow 3 to a welding machine placed beneath a gantry 4, the said conveyor path being formed by pairs of parallel steel beams with conveyor rollers 2 lying therebetween. The rollers 2 project slightly above the beams 1 so that the plates rest solely on the rollers by which the friction of the plates is substantially reduced when they are advanced along the said path by driving means not shown in FIG. 1.

The section to be welded to the plate is brought into position beneath the gantry and is forced down against the plate during the welding operation. The plate with the section welded thereto is then removed from the gantry 4 in the direction of the arrow 3.

The section is passed to the gantry 4 through a smaller gantry 5 which is suspended beneath two brackets 6 and 7, FIGS. 1 and 2. The sections 8 are resting each on its bench 9 on a nine-wheeled wagon 10, see also FIGS. 3 and 4, which is moving on rails 11, When a section 8 has been passed into position beneath the gantry 5, it is picked up by a crane having a number of magnets 14 suspended from a yoke. The yoke is suspended from telescopically extendable carrying arms 15 and 16 which may be moved towards built-in hydraulic cylinders. The arms are suspended in a crane wagon 17 having wheels 18 moving on rails 19 in the gantry 5. The crane lifts the section 8 from the bench 9, turning it by means of the arms 15 and 16. The said arms are, in fact, as appears from FIG. 4 connected with the yoke 13 and the wagon 17 by means of pivots 20 at different levels in relation to one another. It is thereby possible not only to lift the yoke 13 from the position indicated in FIG. 4, but also to turn it, for example through 90°, into the position indicated by a dotted line 13', by which the section is raised into the position indicated by 21.

Should the section 8 have become warped while still lying on the bench 9, the magnets 14 may be pressed against the body of the section by means of the hydraulic cylinders, by which any longitudinal curvature of the body of the section is eliminated.

Figure 4:
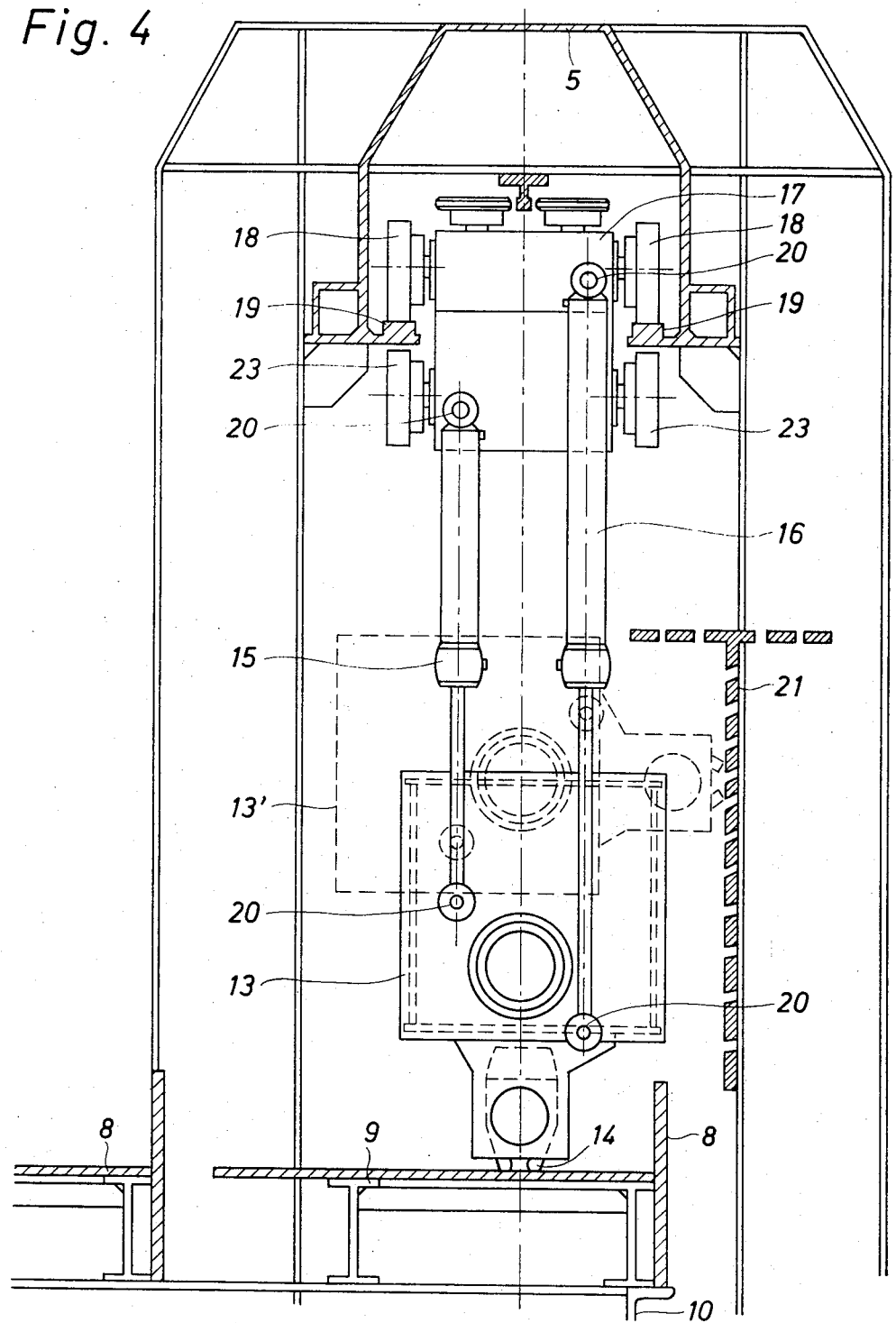
FIG. 4 is a section on the line IV—IV of FIG. 1, shown on a larger scale.

With the section 21 suspended in the position indicated in FIG. 4 the crane moves the section through the gantry 5 to the gantry 4, through which the rails 19 are passing. The welding machine, omitted in the drawing for the sake of clarity, is displaced so that the welding point will be located on the upper side of the plate 22 lying on the conveyor rollers 2, directly beneath the section 21, see FIG. 5, which is on a scale half that of FIG. 4, cf. the distance between the rails 19 in the two Figures.

Figure 5:
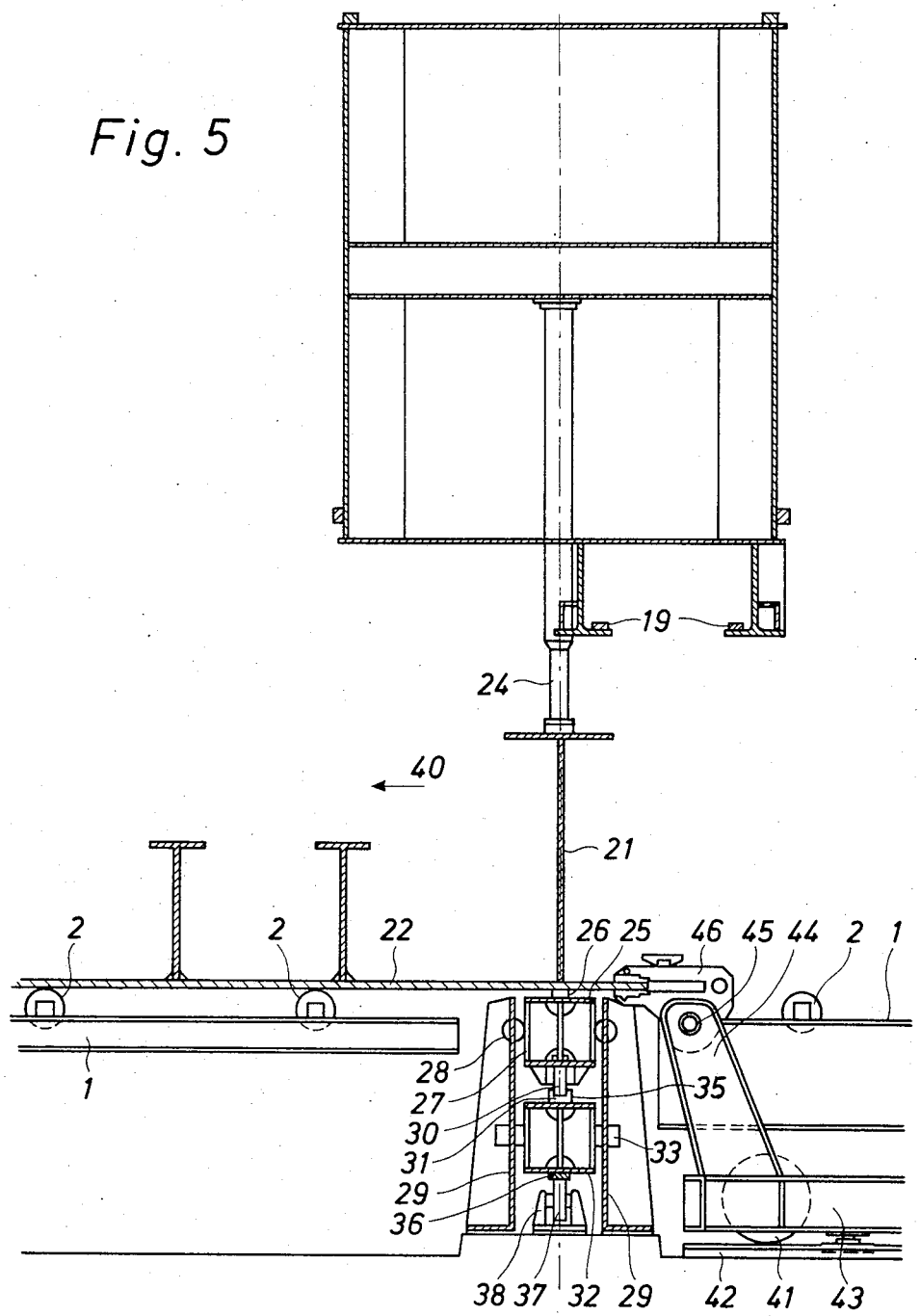
FIG. 5 is a section on the line V—V of FIG. 1.

The section 21 is now lowered towards the plate 22 by the crane, and the welding operation may be commenced, the wagon 17 with its wheels 23 being adapted to be pressed against the underside of the rails 19. However, the pressure obtained thereby is but a limited one, but the two adjacent conveyor rollers 2 are, in fact, only capable of absorbing a limited pressure. If it is desired to exert a substantial pressure while the section 21 is being welded to the plate 22, hydraulic pressure arms 24, FIGS. 5 and 6, may be arranged vertically above the welding point. Beneath the welding point may be placed a vertically displaceable anvil which during the welding operation keeps the plate 22 raised above the rollers 2 as indicated in FIG. 5. As anvil or holding-up member use is made of a beam consisting of a through-going, lying H-girder 25 with an upper pressure rail 26 welded thereto and with welded side plates 27 opposite guide rollers 28 which are mounted in a pair of side walls 29. The H-girder 25 is resting via rollers 30 on conical rail portions 31 which opposite each roller 30 are attached to a through-going H-girder 32 having guide pins 33 introduced into horizontal slits 34 provided in the walls 29. The girder 32 is guided laterally by means of lateral collars 35 provided on the rails 31., the said collars embracing the rollers 30. The girder 32 is provided on its underside with a rail 36 by which it rests on a number of rollers 37 supported in fixed bearings 38.

When the girder 32 is displaced longitudinally by mechanical means 29 (not described in detail), the wedge rails 31 will raise the rollers 30 and thus move the girder 25 and the plate 22 clear of the conveyor rollers 2. The pressure arms 24 are then forced down against the rail 21 which is still retained by means of the magnets 14 to ensure its angular position. In this manner it becomes possible to weld the rail 21 to the plate 22 under a pressure of about 200 t. When the girder 25 and the arms 24 are withdrawn, the plate 22 may be advanced in the direction of an arrow 40, shown in FIG. 5, and corresponding to the direction of the arrow 3 in FIG. 1, and the said advancement takes place by means of a wagon 43 which has wheels 41 running on rails 42 and which carries arms 44 with clamping claws 46 suspended pivotally about pivots 45. The wagon 43 cannot, however, be moved further in the direction of the arrow 40 from the position shown in FIG. 5.

The wagon 10 shown in FIG. 1 has an empty bench 47, whereas the neighboring bench 48 has already been loaded again with a section 49 by a crane (not shown) travelling above the wagon 10. Moving to and fro on its rails 11 the wagon 10 will thus be able continually to supply the crane with sections.

Figure 6:
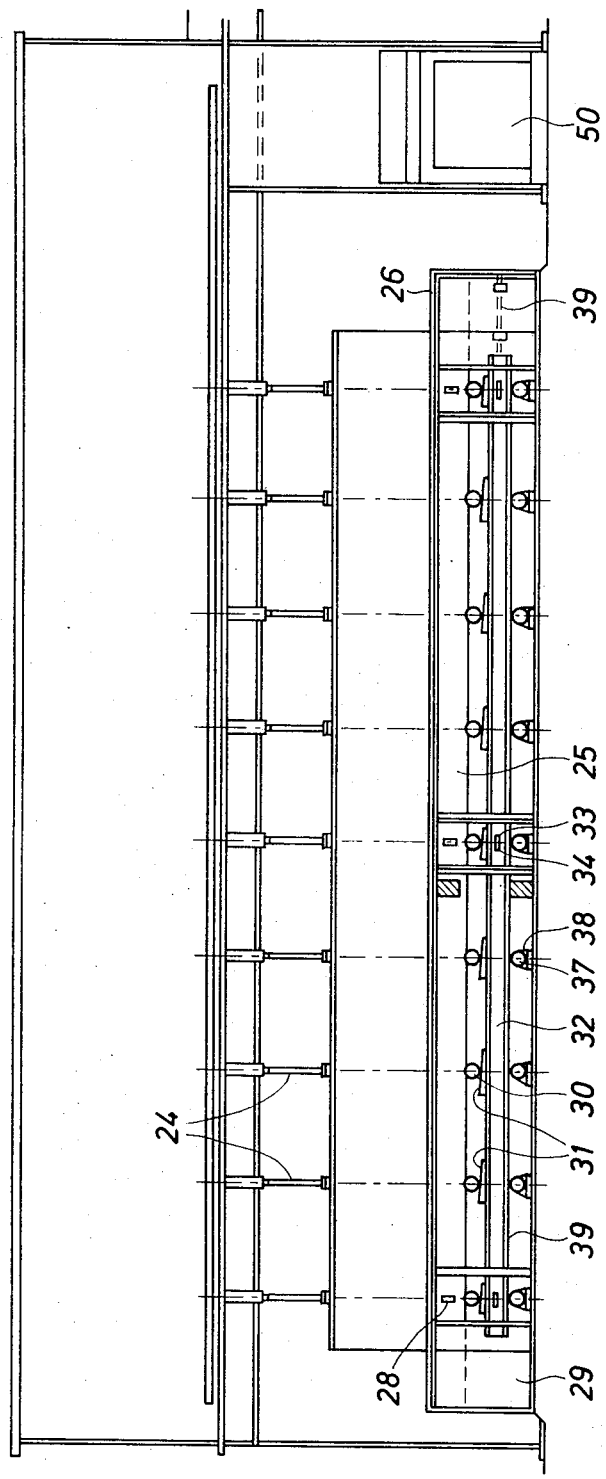
FIG. 6 is an endview of the other part of the plant shown in FIG. 1, on a larger scale.

The movement of the crane and the wagons 10 and 43 may be controlled from a control panel 50, FIGS. 1 and 6.

I claim:

1. A section handling apparatus for advancing sections to be welded to plates, the said sections being fed to the welding machine in their longitudinal direction which extends transversely of the direction of feeding and discharging the plates, said apparatus comprising a low wagon crane supported by travelling wheels on rails and rotatable carrying magnets arranged in a row for picking up sections from benches on a transversely movable table and for advancing the sections in their longitudinal direction to the point of welding.

2. A machine as claimed in claim 1, wherein said wagon crane comprises a magnet yoke rotatable about is longitudinal axis for picking up the horizontally arranged sections from benches on a transversely movable table, turning the sections for example through 90° about their longitudinal axis, and advancing the sections in their longitudinal direction to the point of welding.

3. A machine as claimed in claim 2 further comprising pressure means, for example underlying travelling wheels, provided directly beneath said rails, the carrying magnets being rigidly suspended or compulsorily controlled in the yoke and the yoke, again, being compulsorily controlled in the crane wagon by a plurality of hydraulic cylinders.

4. A machine as claimed in claim 3, wherein said hydraulic cylinders are incorporated in telescopic rods which, swingably suspended in the crane wagon, carry the crane yoke.

5. A machine as claimed in claim 1, further comprises a vertically displaceable holding-up member provided beneath the welding point and the plate to which the section is to be welded.

6. A machine as claimed in claim 5, wherein the holding-up member comprises a vertically displaceable beam resting on rollers which rest on a horizontally displaceable wedge rail.

\* \* \* \* \*